United States Patent
Held et al.

(10) Patent No.: US 7,313,610 B2
(45) Date of Patent: Dec. 25, 2007

(54) METHOD AND ARRAY FOR DETERMINING INTERNET PROTOCOL ADDRESSES OF A TERMINAL ARRAY

(75) Inventors: Walter Held, Geretsried (DE); Volker Mendisch, Eichenau (DE)

(73) Assignee: Siemens AG, Munich (DE)

( * ) Notice: Subject to any disclaimer, the term of this patent is extended or adjusted under 35 U.S.C. 154(b) by 715 days.

(21) Appl. No.: 10/450,087

(22) PCT Filed: Jan. 23, 2002

(86) PCT No.: PCT/DE02/00224

§ 371 (c)(1),
(2), (4) Date: Oct. 27, 2003

(87) PCT Pub. No.: WO02/065726

PCT Pub. Date: Aug. 22, 2002

(65) Prior Publication Data

US 2004/0064536 A1      Apr. 1, 2004

(30) Foreign Application Priority Data

Feb. 13, 2001   (DE) .............................. 101 06 619
Jun. 20, 2001   (DE) .............................. 101 29 791

(51) Int. Cl.
*G06F 15/177*   (2006.01)

(52) U.S. Cl. ...................... 709/222; 709/203; 709/219; 709/220; 709/223; 709/228; 709/245; 710/9; 711/200; 711/202; 711/211

(58) Field of Classification Search ................ 709/203, 709/220, 223, 224, 228, 219, 222, 227, 245; 710/9; 711/200, 211, 202

See application file for complete search history.

(56) References Cited

U.S. PATENT DOCUMENTS

| | | | |
|---|---|---|---|
| 5,535,338 A * | 7/1996 | Krause et al. | 709/222 |
| 5,724,510 A * | 3/1998 | Arndt et al. | 709/220 |
| 5,884,024 A | 3/1999 | Lim et al. | |
| 5,966,705 A * | 10/1999 | Koneru et al. | 707/9 |
| 5,974,562 A * | 10/1999 | Townsend et al. | 714/4 |
| 6,012,088 A | 1/2000 | Li et al. | |
| 6,073,178 A | 6/2000 | Wong et al. | |
| 6,115,545 A | 9/2000 | Mellquist | |
| 6,212,563 B1 * | 4/2001 | Beser | 709/227 |
| 6,240,449 B1 * | 5/2001 | Nadeau | 709/223 |
| 6,286,039 B1 * | 9/2001 | Van Horne et al. | 709/221 |
| 6,363,423 B1 * | 3/2002 | Chiles et al. | 709/224 |

(Continued)

FOREIGN PATENT DOCUMENTS

WO       WO 96/39769       12/1996

*Primary Examiner*—Michael Won
(74) *Attorney, Agent, or Firm*—McCormick, Paulding & Huber LLP

(57) ABSTRACT

The invention relates to a method and an array for determining the IP addresses of a terminal array connected to an IP network by means of a telecommunication network. A pseudo-hardware address is administratively assigned as identifier to the subscriber connection of the terminal array. Said identifier is stored in the peripheral area of the telecommunication network and transmitted in an IP address request by the terminal array to a network management unit for assigning IP addresses. Said network management unit assigns an IP address using the identifier of the terminal connection and transmits said address to the terminal array.

5 Claims, 3 Drawing Sheets

U.S. PATENT DOCUMENTS

| | | | |
|---|---|---|---|
| 6,378,000 B1 * | 4/2002 | Akatsu et al. | 709/245 |
| 6,427,174 B1 * | 7/2002 | Sitaraman et al. | 709/245 |
| 6,532,217 B1 * | 3/2003 | Alkhatib et al. | 370/252 |
| 6,539,431 B1 * | 3/2003 | Sitaraman et al. | 709/226 |
| 6,629,145 B1 * | 9/2003 | Pham et al. | 709/230 |
| 6,687,755 B1 * | 2/2004 | Ford et al. | 709/245 |
| 6,725,264 B1 * | 4/2004 | Christy | 709/225 |
| 7,139,839 B2 * | 11/2006 | White et al. | 709/245 |
| 2002/0055924 A1 * | 5/2002 | Liming | 707/100 |

* cited by examiner

METHOD AND ARRAY FOR DETERMINING INTERNET PROTOCOL ADDRESSES OF A TERMINAL ARRAY

CROSS-REFERENCE TO RELATED APPLICATIONS

This application is entitled to the benefit of and incorporates by reference essential subject matter disclosed in German International Application No. PCT/DE02/00224 filed on Jan. 23, 2002, German Patent Application No. 10106691.8 filed on Feb. 13, 2001, and German Patent Application No. 10129791.2 filed on Jun. 20, 2001.

FIELD OF THE INVENTION

The invention relates to a method for determining an IP address that is uniquely assigned to a terminal arrangement connected to an IP network via a subscriber line of a telecommunications network, and an arrangement suitable for such a method.

BACKGROUND OF THE INVENTION

In an Internet Protocol network or IP network, i.e. in a network that uses the TCP/IP Protocol, each network device and each terminal arrangement needs a unique Internet Protocol address or IP Address. In IP version 4 (Ipv4), an IP address, which is made up of a network address and a device address, consists of four numbers (octets) each separated by a dot, for example 204.107.64.2. In later IP versions, more octets are used for the IP address. IP addresses can be created manually and permanently assigned to a terminal arrangement in a network. Manual configuration of an IP network is time consuming, however, and only of interest for smaller, rarely changed sub-networks.

To automate the assignment of IP addresses, network operators hence normally use a BOOTSTRAP protocol or BOOTP as it is known, or a Dynamic Host Configuration Protocol or DHCP. BOOTP is a TCP/IP protocol that can be used by terminal arrangements to find out their IP address or other network information such as server addresses and gateway data. When a terminal arrangement boots up, it transfers a BOOTP REQUEST to the BOOTP server in a UDP packet (USER DATA PROTOCOL, an unreliable TCP/IP protocol), said server sending back the required IP address in a BOOTP RESPONSE message.

In this procedure, the BOOTP REQUEST and BOOTP RESPONSE messages use an IP broadcast function, which can be used to send messages before the specific IP address is known. Such a method is described in detail in U.S. Pat. No. 6,115,545, for example.

DHCP is also a piece of software for automatic assignment of IP addresses to terminal devices that log into a TCP/IP network. DHCP software normally runs on servers, and such a DHCP server is described in U.S. Pat. No. 5,884,024 for example. The main way in which DHCP differs from BOOTP is that once an IP address is assigned it is stored and used again for later DHCP request messages.

In order to assign an IP address, BOOTP servers or DHCP servers require a hardware address of a terminal arrangement, which is sent by the network interface of said terminal arrangement to the respective server in the IP-address request message, e.g. in the BOOTP REQUEST. In networks based on the ETHERNET standard, the hardware address (MAC address) of the Ethernet card forming the network interface is used as a uniquely assignable identifier for each IP-address request and IP-address response (BOOTP REQUEST, BOOT RESPONSE).

Terminal arrangements in the sense intended here are, for example, network computers having Ethernet card or modem as network interface. In particular, however, terminal arrangement is also used to mean network terminating units known as Integrated Access Devices or IADs. Such an IAD is a network terminating unit for multiplexing different communications technologies at the subscriber end onto a single telecommunications network line. The IAD also demultiplexes the data streams coming from the network into the relevant channels.

A telecommunications network line for connecting to an IAD may be an analog telephone line or even an ISDN line, a DSL line or a T1 line. Currently, the most common use of IAD units is the multiplexing of voice and data over a DSL line. DSL stands for Digital Subscriber Line, and, unlike an ISDN line, is not enabled using switching technology but is permanently connected and supplied with voice information and data information via a central network device, a DSL Access Multiplexer or DSLAM for short. The DSL digital subscriber lines of a particular local area emanate from such a DSLAM, which is usually part of a peripheral network node, and a specific set of subscriber line data (port data) configurable by a central network management system is often stored in the DSLAM for each subscriber line.

A network operator can manage terminal arrangements such as IADs in an IP network centrally using SNMP over IP for instance, where SNMP stands for Simple Network Management Protocol, which is a network monitoring and control protocol used throughout the world. In order to manage a terminal arrangement, the network operator must assign the allocated network management interface a static IP address that can be used to exchange network management messages. Furthermore, the IP routers and the network management system within the IP network of the network operator must also know this IP address. Network operators do this using one of the BOOTP or DHCP protocols in the aforementioned way. The unique identifier for defining an IP address in a BOOTP server or DHCP server is the hardware address of the terminal arrangement.

When installing a terminal arrangement, the network operator must enter the required information in the BOOTP server with the hardware address of the internet protocol interface of the relevant network arrangement of the terminal arrangement used. To do this, either the exact hardware address of the terminal arrangement must be entered manually by the subscriber prior to installation, or the subscriber must register the hardware address with the network operator via telephone or post, once the terminal arrangement has been installed at the subscriber's premises. If, for example, the subscriber has not obtained the terminal arrangement from the network operator, but purchased it on the open market, then registration of the hardware address of the terminal arrangement by the subscriber is currently the only solution. Both registration options mentioned are very time consuming, require coordination between subscriber and network operator, are prone to errors and can lead to undesirable delays in service availability after the terminal arrangement has been installed at the subscriber's premises.

The object of the invention is to define a more advantageous method of assigning IP addresses for terminal arrangements, and to define suitable arrangements for this purpose.

SUMMARY OF THE INVENTION

A method according to the invention for determining an IP address that is uniquely assigned to a terminal arrangement connected to an IP network via a subscriber line of a telecommunications network, contains the following procedural steps:

an identifier permanently assigned to the subscriber line of the terminal arrangement is allocated by a network management device of the IP network;

said identifier of the subscriber line is stored in the peripheral area of the telecommunications network;

said stored identifier is transferred in an IP-address request message from the terminal arrangement to a network management unit for assigning IP addresses;

the network management unit for assigning IP addresses uses the identifier of the subscriber line to assign an IP address, and the network management unit sends said IP address to the terminal arrangement.

The identifier permanently assigned to the subscriber line can be allocated when installing the subscriber lines, for example, by configuring the subscriber-line card in a network element in the peripheral area of a telecommunications network or in a DSL access multiplexer. The identifier can also be allocated using a network management protocol such as SNMP, and stored in the peripheral area of the telecommunications network in a network element having an already known IP address. As regards assignment of the identifier, the network management device is not necessarily identical to the device in which the network management unit for assigning IP addresses is located. Rather, a network management function is intended that can be implemented both centrally and locally by a known means.

An aforementioned network element in the peripheral area of a telecommunications network may, for example, be a subscriber line trunk circuit via which subscriber lines can be connected to a switching center. In such a subscriber line trunk circuit, as also in a DSL access multiplexer, the individual subscriber lines are configured, and subscriber-line port data stored for each subscriber line.

Peripheral area, in the sense used here in the context of subscriber lines, thus means network-based or subscriber-based units that can be assigned specific subscriber lines. If subscriber lines are configured directly from a central unit of a telecommunications network, the assigned identifier can also be stored in such a central unit.

The saving of the identifier of the subscriber line in the peripheral area of a telecommunications network can mean saving it in a network element assigned to a number of subscriber lines, such as a subscriber line trunk circuit or a DSL access multiplexer. Said identifier of each subscriber line could be stored here, for example, as part of the subscriber-line port data of this subscriber line. In this case, the identifier must also be transferred to the terminal arrangement so that said terminal arrangement can use the identifier in an IP-address request message.

The identifier of the subscriber line can also be stored at the terminal end of a subscriber line, for example in a network terminating unit. Such a network terminating unit is used for converting the protocols and data formats that can be processed by the individual terminal devices of the terminal arrangement into the protocols and data formats that can be carried on the subscriber line, and if applicable for multiplexing and demultiplexing the data of each of the information types. Such a network terminating unit can be viewed as part of the telecommunications network, but must also be assigned to the terminal arrangement. In one embodiment of a method according to the invention, the identifier permanently assigned to the subscriber line is permanently stored, e.g. using network management functions, directly in the network terminating unit of said subscriber line. Here it would be advantageous to have the identifier of the terminal arrangement immediately available for sending an IP-address request message. In addition, less signaling would be required on the subscriber line. The disadvantage would be that when replacing the network terminating unit because of a fault, a reconfiguration would be necessary.

In another embodiment of a method according to the invention, in which the identifier assigned to the subscriber line is stored in a network element assigned to a number of subscriber lines, e.g. in a subscriber line trunk circuit, said stored identifier is transferred to the terminal arrangement at initialization of the terminal arrangement, for example when enabling the network terminating unit at the terminal end. In this case it is recommended to also store the identifier, at least temporarily, in the terminal arrangement so that it is always available for an IP-address request message.

One advantage of a method according to the invention is that at the same time as assigning an identifier to a subscriber line, for example when configuring a peripheral network unit, the generation of a dynamic IP address and its assignment to the specified identifier can also be performed in the unit for assigning IP addresses in the network management system. If said unit for assigning IP addresses in the network management system is a DHCP server, the IP address to be assigned in the future for IP-address requests can also be permanently assigned at this point. This is done by storing the unique identifier in the peripheral area of the telecommunications network when configuring the assigned subscriber line, and in the network management unit for assigning IP addresses.

A terminal arrangement having a communications interface for connecting to an IP network via a subscriber line of a telecommunications network has an identifier storage arrangement for storing a unique identifier. Such a terminal arrangement according to the present invention contains a controller for receiving a unique identifier via the communications interface of a peripheral network element of the telecommunications network. In addition, the controller of such a terminal arrangement is used for storing the received identifier in the identifier storage device and for sending an IP-address request message using said stored identifier to a network management device of the IP network via the communications interface.

Such a terminal arrangement can, for example be an H.323 videophone containing a communications interface adapted to the subscriber line. It may also be a computer having a suitable communications interface. In addition, such a terminal arrangement may consist of a network terminating unit for multiplexing different communications technologies, to which data terminals, voice terminals, video terminals or combinations of these are, or can be, connected as required. As regards the function according to the invention, the network terminating unit would then be the minimum configuration level of such a terminal arrangement according to the invention.

Unlike a conventional terminal arrangement, which sends an IP-address request message to the management system of the IP network using a hardware identifier stored by the device manufacturer in a hardware identifier store, a terminal arrangement according to the invention can receive an identifier from the telecommunications network via the communications interface. Said identifier can, for example, be transferred from a network unit of the telecommunications network during the initialization phase of the communications interface. A terminal arrangement according to the invention uses the identifier received via the communications interface to form an IP-address request message. Provided an IP address of the unit in which the identifier is to be stored is known (e.g. by storing the identifier in a DSLAM), the identifier can also be transferred from a network management device using a network management function, for example SNMP over IP.

In a particularly advantageous embodiment of a terminal arrangement according to the invention, a hardware-identifier store containing a permanently defined hardware identifier is provided, and an identifier storage device according to the invention for storing an allocated identifier. Such a terminal arrangement contains a controller for checking whether a unique identifier is stored in the identifier storage device. If said controller cannot establish that a unique allocated identifier is stored, it effects an IP-address request message using the permanently defined hardware identifier. One advantage of such a terminal arrangement is that it can be used both in IP networks that have provision to allocate an identifier for each subscriber line, and in IP networks that use a permanently defined hardware identifier.

Since the identifier allocated by the network management is used instead of a hardware identifier or hardware address when determining an IP address, the allocated identifier can also be referred to generally as a pseudo-hardware address, as is done in the description of the exemplary embodiment.

A DSL access multiplexer for supplying digital subscriber lines with multiplexed information contains, according to the invention, a storage arrangement for storing specific to a subscriber line a subscriber line identifier. In addition, a controller is provided for storing in said storage arrangement, under the control of a network management unit, an identifier specific to the subscriber line, and on initialization of a network terminating unit at the subscriber end, for transferring the stored identifier specific to the subscriber line to said network terminating unit. Such a DSL access multiplexer enables simple central configuration of a network irrespective of the hardware at the subscriber end.

BRIEF DESCRIPTION OF THE DRAWINGS

The invention is explained in more detail below in particularly advantageous exemplary embodiments with reference to the figure, in which.

DETAILED DESCRIPTION OF THE PREFERRED EMBODIMENT

Figure 1:
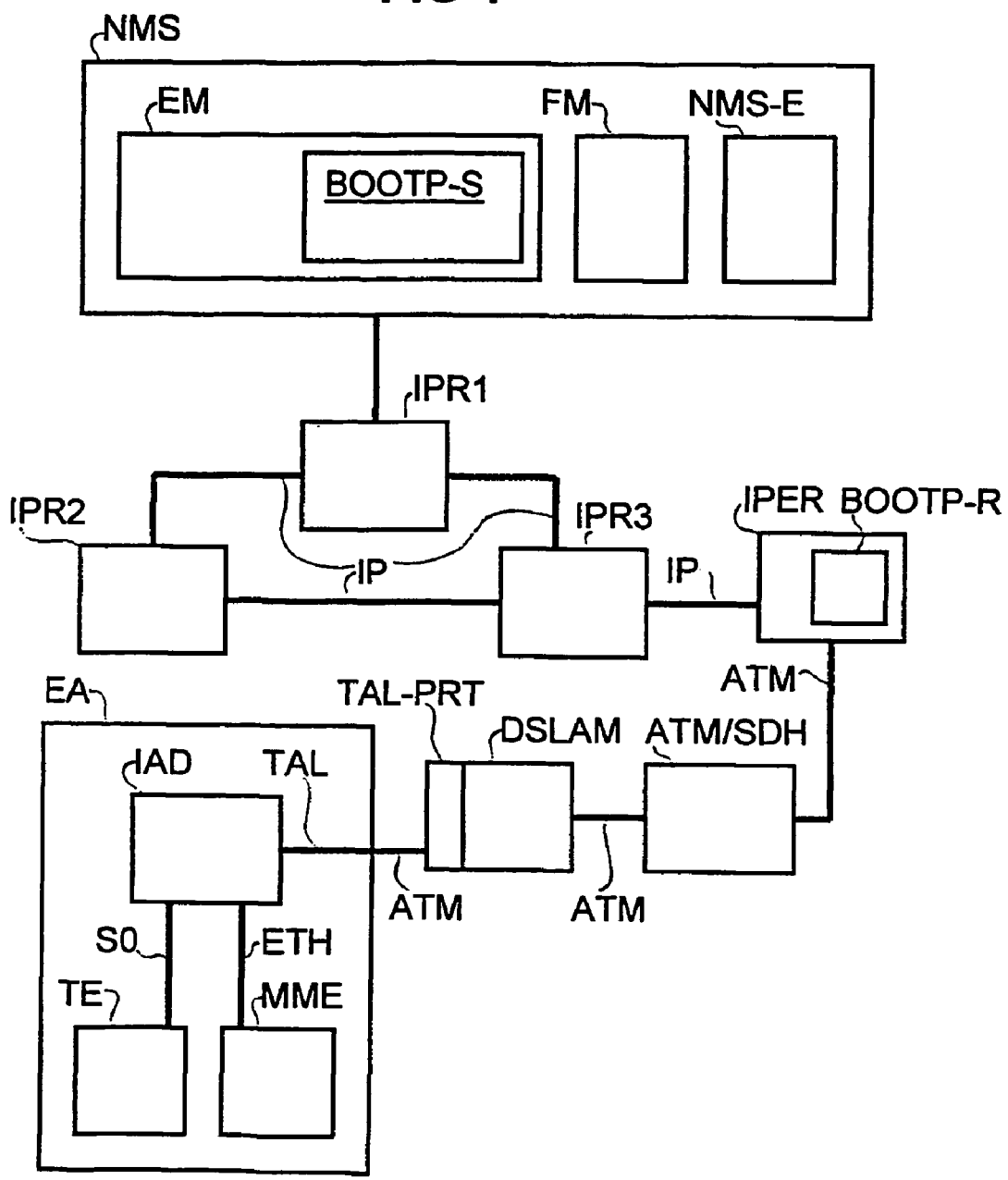
FIG. 1 shows a schematic block diagram of components of an Internet Protocol network in which a method according to the invention can be used.

FIG. 1 shows a network management system NMS of an Internet Protocol network having an element management unit EM, an error management unit FM and a network-management-system input unit NMS-E for operation by an operating person. The element management unit EM includes, apart from subunits not shown separately, a bootstrap protocol server BOOTP-S. The network management system NMS is connected via a LAN connection to an Internet Protocol data network represented by three Internet Protocol routers IPR1, IPR2 and IPR3 and an Internet Protocol gateway router IPER. Information is exchanged between the routers IPR1, IPR2, IPR3 and IPER of said network area on the basis of the IP Internet Protocol.

The Internet Protocol gateway router IPER, also referred to as an edge router from the expression edge device, is fitted with an ATM card, which is not shown, and thereby enables the transition from the Internet Protocol network into a telecommunications network using the ATM Asynchronous Transfer Mode to transfer information. In the exemplary embodiment shown, the protocol gateway router IPER is connected according to the ATM/SDH standard to an ATM network whose peripheral area contains a DSL access multiplexer DSLAM. The protocol gateway router IPER contains a bootstrap protocol relay function BOOTP-R, one of whose tasks is to deliver bootstrap protocol messages to network elements DSLAM, terminal arrangements EA and the network management system NMS.

Since the Internet Protocol gateway router IPER takes on the function of an Internet Protocol relay, it is also called a relay router IPER.

The DSL access multiplexer DSLAM contains subscriber-line ports TAL-PRT, from which emanate subscriber lines TAL. In the figure, only one subscriber line TAL is shown, which is connected to a network terminating unit IAD of a terminal arrangement EA. Permanent virtual ATM connections, or ATM-PVCs as they are known, are set up from the Protocol gateway router IPER to the network terminating unit IAD, and also to every other network terminating unit IAD not shown in the figure. Information and control commands from the network management system NMS can be transferred over these virtual ATM connections from the Internet Protocol gateway router IPER to the network terminating units IAD on the basis of the aforementioned SNMP protocol. The Internet Protocol gateway router IPER merely has a switching function as regards the management channels between the network management system NMS and the network terminating units IAD.

The terminal arrangement shown in FIG. 1 also comprises, in addition to the network terminating unit IAD, a telephony terminal TE, which is connected via an S0-interface S0 to the network terminating unit IAD. A multimedia terminal MME is also provided, which is connected to the network terminating unit IAD via an Ethernet interface ETH.

Figure 2:
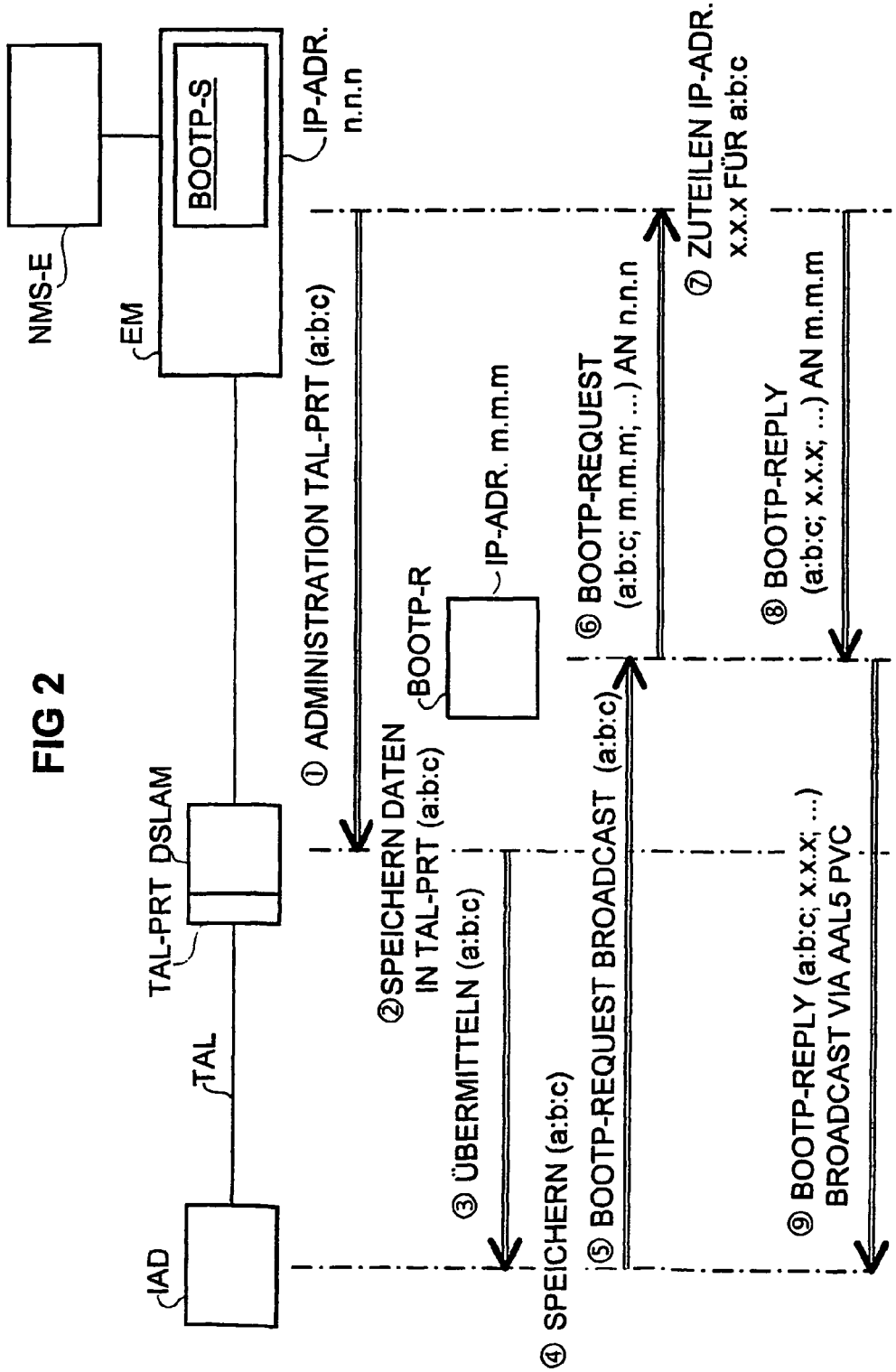
FIG. 2 shows a schematic diagram of the procedure of a particularly advantageous embodiment of a method according to the invention with reference to a network constellation shown in FIG. 1.

FIG. 2 shows some components from FIG. 1, plus procedural steps of a particularly advantageous embodiment of a method according to the invention. In detail, FIG. 2 shows the network-management-system input unit NMS-E, the element management unit EM containing the bootstrap protocol server BOOTP-S and having the Internet Protocol address n.n.n, the bootstrap protocol relay function BOOTP-R of the protocol gateway router having the Internet Protocol address m.m.m, the DSL access multiplexer DSLAM containing the subscriber-line port TAL-PRT, the subscriber line TAL and the network terminating unit IAD.

Step 1 in the method shown in FIG. 2 is the administration of the subscriber-line port TAL-PRT by an operating person who enters data at the network-management-system input unit NMS-E, and the transfer of this input data including a pseudo-hardware address a:b:c of the subscriber line via a virtual ATM channel to the DSL access multiplexer DSLAM.

Step 2 involves the storing of the subscriber-line port data in the subscriber-line port TAL-PRT of the DSLAM including the pseudo-hardware address a:b:c.

In step 3, the pseudo-hardware address a:b:c is transferred from the DSLAM to the network terminating unit IAD, for example during the initialization phase of the network terminating unit IAD.

In step 4, the pseudo-hardware address a:b:c is stored in the network terminating unit IAD.

In step 5, the network terminating unit IAD sends an IP-address request message BOOTP REQUEST containing the pseudo-hardware address a:b:c to the bootstrap protocol relay function BOOTP-R using a broadcast function.

In step 6, the bootstrap protocol relay function BOOTP-R sends an IP-address request message BOOTP REQUEST containing the pseudo-hardware address a:b:c and containing its own Internet Protocol address m.m.m to the Internet Protocol address n.n.n of the network management system NMS, specifically to the bootstrap protocol server BOOTP-S.

In step 7, the bootstrap protocol server BOOTP-S assigns the network terminating unit IAD the Internet Protocol address x.x.x. for the hardware address a:b:c.

In step 8, said Internet Protocol address x.x.x is transferred with the pseudo-hardware address a:b:c and additional server information in a bootstrap protocol response message BOOTP REPLY to the Internet Protocol address m.m.m of the bootstrap relay function BOOTP-R. In a ninth step, the bootstrap relay function BOOTP-R sends said received message over the virtual ATM connection AAL5 PVC to the network terminating unit IAD using a broadcast transmission.

Figure 3:
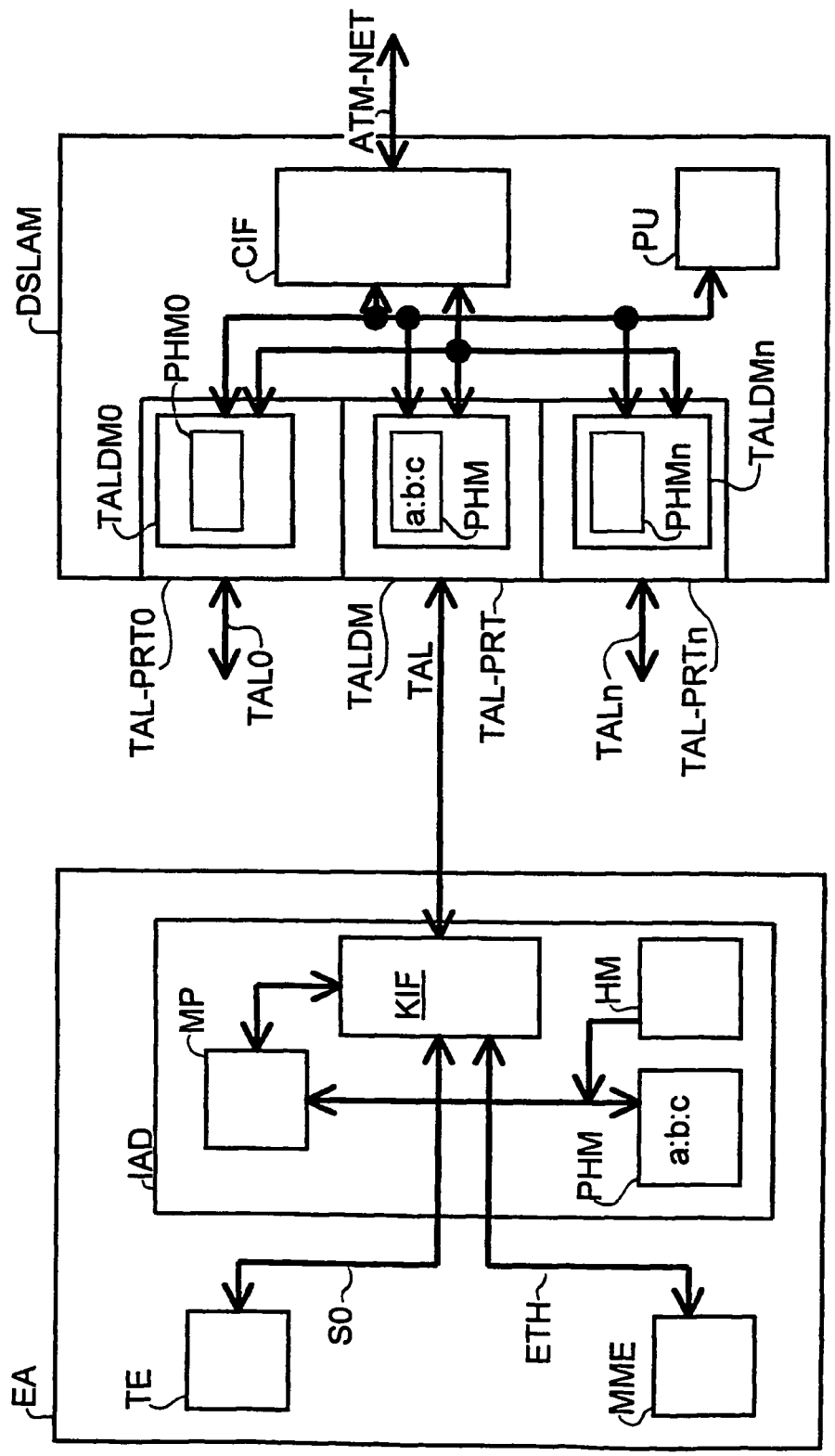
FIG. 3 shows a schematic block diagram of a particularly advantageous embodiment of a terminal arrangement according to the invention and of a DSL access multiplexer according to the invention.

FIG. 3 shows a terminal arrangement EA, which, like the terminal arrangement EA in FIG. 1, contains a telephony terminal TE, which is connected via an S0-interface S0 to a network terminating unit IAD in the terminal arrangement EA, and a multimedia terminal MME, which is connected via an Ethernet interface ETH to the network terminating unit IAD. In the network terminating unit IAD in FIG. 3, a communications interface KIF is also shown, connected to which is a subscriber line TAL, and which has an Ethernet interface ETH for connecting the multimedia terminal MME plus an S0-interface S0 for connecting the telephony terminal TE. In addition, the communications interface KIF is connected to a control unit MP. The communications interface KIF has the task of forwarding information and commands received on the subscriber line TAL to the units TE, MME and MP of the terminal arrangement EA, which can process said information or commands and perform the reformatting and demultiplexing tasks necessary for this. In the same way, the communications interface KIF is meant to multiplex and reformat as applicable information or commands received from the individual units TE, MME, MP of the terminal arrangement EA, so that these can be transferred on the subscriber line TAL to a telecommunications network represented in FIG. 3 only by the subscriber line TAL, a DSL access multiplexer DSLAM and a connection ATM-NET unconnected at one end. The control unit MP of the network terminating unit IAD, which is normally implemented by a processor unit containing appropriate program commands, controls the communications interface KIF and has a read/write connection to a pseudo-hardware-address store PHMx, to which a pseudo-hardware address a:b:c can be written. In addition, the control unit MP has a read connection to a hardware-address store HM.

The DSL access multiplexer DSLAM shown in FIG. 3 contains subscriber-line ports TAL-PRT0, TAL-PRT, TAL-PRTn, connected to each of which is a subscriber line TAL0, TAL, TALn. Each of the subscriber-line ports TAL-PRT0, TAL-PRT, TAL-PRTn has a pseudo-hardware-address storage device PHM0, PHM, PHMn as part of a subscriber-line port-data storage device TALDM0, TALDM, TALDMn. The pseudo-hardware address a:b:c is stored in the pseudo-hardware-address storage device PHM of the subscriber-line port TAL-PRT0 for connection of the subscriber line TAL. The DSL access multiplexer DSLAM also contains a communications interface CIF, via which the individual subscriber-line ports TAL-PRT0, TAL-PRT, TAL-PRTn can be interfaced to the central telecommunications network which is not shown in detail.

The communications interface CIF is used here for adapting the data and the message formats and also for multiplexing and demultiplexing information and control data if applicable.

The DSL access multiplexer DSLAM also contains a control unit PU for controlling the communications interface CIF and the subscriber-line ports TAL-PRT0, TAL-PRT, TAL-PRTn.

The particularly advantageous embodiment of a DSL access multiplexer DLSAM, as shown in FIG. 3, receives via a telecommunications network ATM-NET a management function for assigning pseudo-hardware addresses to specific subscriber lines including a pseudo-hardware address a:b:c for a subscriber line TAL. The control unit PU of the DSL access multiplexer DSLAM effects, on the basis of this management information, the storage of the pseudo-hardware address a:b:c in the pseudo-hardware-address storage device PHM of the subscriber-line port-data storage unit TALDM assigned to the subscriber-line port TAL-PRT.

When the network terminating unit IAD of the terminal arrangement EA shown in FIG. 3 is initialized, i.e. when said network terminating unit IAD is supplied with power or physically connected via the subscriber line to the subscriber-line port TAL-PRT of the DSL access multiplexer DSLAM, the pseudo-hardware address a:b:c stored in the pseudo-hardware-address storage device PHM is transferred via the subscriber line TAL to the network terminating unit IAD, and stored by the control unit MP of the network terminating unit IAD in the pseudo-hardware storage device PHMx of the network terminating unit IAD.

If the terminal arrangement EA needs a dynamic IP address, the control unit MP of the network terminating unit IAD checks whether a pseudo-hardware address is stored in the pseudo-hardware storage device PHMx. If so, then the control unit MP reads said pseudo-hardware address a:b:c and uses it in an IP-address request BOOTP REQUEST, which is transferred via the communications interface KIF of the network terminating unit IAD and via the subscriber line TAL to a bootstrap protocol server BOOTP-S shown in FIG. 1.

If the pseudo-hardware storage device PHMx does not contain a pseudo-hardware address, the control unit MP reads a hardware address stored in the hardware-address store HM, and uses this in an IP-address request message BOOTP REQUEST. This functionality means that such a terminal arrangement can be used both in network segments that are configured by pseudo-hardware address and in network segments configured in the hitherto standard way. Such a terminal arrangement can hence be used in existing networks, and enables the creation at a later date of a network configuration requiring a method according to the invention.

What is claimed is:

1. A method for determining an IP address that is uniquely assigned to a terminal arrangement connected to an IP network via a subscriber line of a telecommunications network, comprising the following steps of:

allocating a unique identifier to the terminal arrangement by a network management device of the IP network;

storing of the unique identifier in the peripheral area of the telecommunications network and in a network management unit for assigning IP addresses;

assigning an IP address by the network management unit, taking into account the unique identifier stored in the network management unit;

sending an IP address request message from the terminal arrangement to the network management unit, where the message contains the unique identifier previously stored in the peripheral area; and sending the assigned IP address from the network management unit to the terminal arrangement as response to the received IP-address request message;

wherein the unique identifier in the peripheral area of the telecommunications network is stored in a network element, assigned to a number of subscriber lines, and is transferred to the terminal arrangement on initialization of the terminal arrangement.

2. The method as claimed in claim 1, wherein the identifier is saved as part of subscriber-line port data.

3. The method as claimed in claim 1, wherein the identifier is stored—in particular permanently or temporarily—in the terminal arrangement.

4. The method as claimed in claim 1, wherein the identifier is stored in the terminal arrangement on configuration of a subscriber line.

5. The method as claimed in claim 1, wherein the IP address to be sent in response to IP-address requests is permanently assigned when storing the identifier in the network management unit.

* * * * *